(12) United States Patent
Liu et al.

(10) Patent No.: US 9,811,756 B2
(45) Date of Patent: Nov. 7, 2017

(54) METHOD FOR LABELING IMAGES OF STREET SCENES

(71) Applicant: Mitsubishi Electric Research Laboratories, Inc., Cambridge, MA (US)

(72) Inventors: Ming-Yu Liu, Revere, MA (US); Srikumar Ramalingam, Cambridge, MA (US); Oncel Tuzel, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 14/628,808

(22) Filed: Feb. 23, 2015

(65) Prior Publication Data

US 2016/0247290 A1    Aug. 25, 2016

(51) Int. Cl.
*G06K 9/00*    (2006.01)
*G06K 9/46*    (2006.01)

(52) U.S. Cl.
CPC ....... *G06K 9/4604* (2013.01); *G06K 9/00791* (2013.01); *G06K 2009/00953* (2013.01)

(58) Field of Classification Search
None
See application file for complete search history.

(56) References Cited

U.S. PATENT DOCUMENTS

2012/0124461 A1    5/2012    Barnett et al.
2016/0019458 A1*   1/2016    Kaufhold ................ G01S 7/417
                                                          342/25 F

OTHER PUBLICATIONS

Timo Scharwachter, Markus ENzweiler, Uwe Franke, Stefan Roth, "Stixmantics: A Medium-Level Model for Real-Time Semantic Scene Understanding", Computer Vision ECCV 2014 Lecture Notes in Computer Science vol. 8693, 2014, pp. 533-548.*
Lubor Ladick Paul Sturgess, Chris Russell, Sunando Sengupta, Yalin Bastanlar, William Clocksin, Philip H. S. Torr, "Joint Optimization for Object Class Segmentation and Dense Stereo Reconstruction" International Journal of Computer Vision Nov. 2012, vol. 100, Issue 2, pp. 122-133.
Timo Scharwachter, Markus Enzweiler, Uwe Franke, Stefan Roth, "Stixmantics: A Medium-Level Model for Real-Time Semantic Scene Understanding" Computer Vision ECCV 2014 Lecture Notes in Computer Science vol. 8693, 2014, pp. 533-548.
P. Felzenszwalb, O. Veksler, "Tiered Scene Labeling with Dynamic Programming" IEEE Conference on Computer Vision and Pattern Recognition (CVPR), 2010.

* cited by examiner

*Primary Examiner* — Fred Hu
(74) *Attorney, Agent, or Firm* — Gene Vinokur; James McAleenan; Hironori Tsukamoto

(57) ABSTRACT

A method labels an image of a street view by first extracting, for each pixel, an appearance feature for inferring a semantic label, a depth feature for inferring a depth label. Then, a column-wise labeling procedure is applied to the features to jointly determine the semantic label and the depth label for each pixel using the appearance feature and the depth feature, wherein the column-wise labeling procedure is according to a model of the street view, and wherein each column of pixels in the images includes at most four layers.

13 Claims, 4 Drawing Sheets

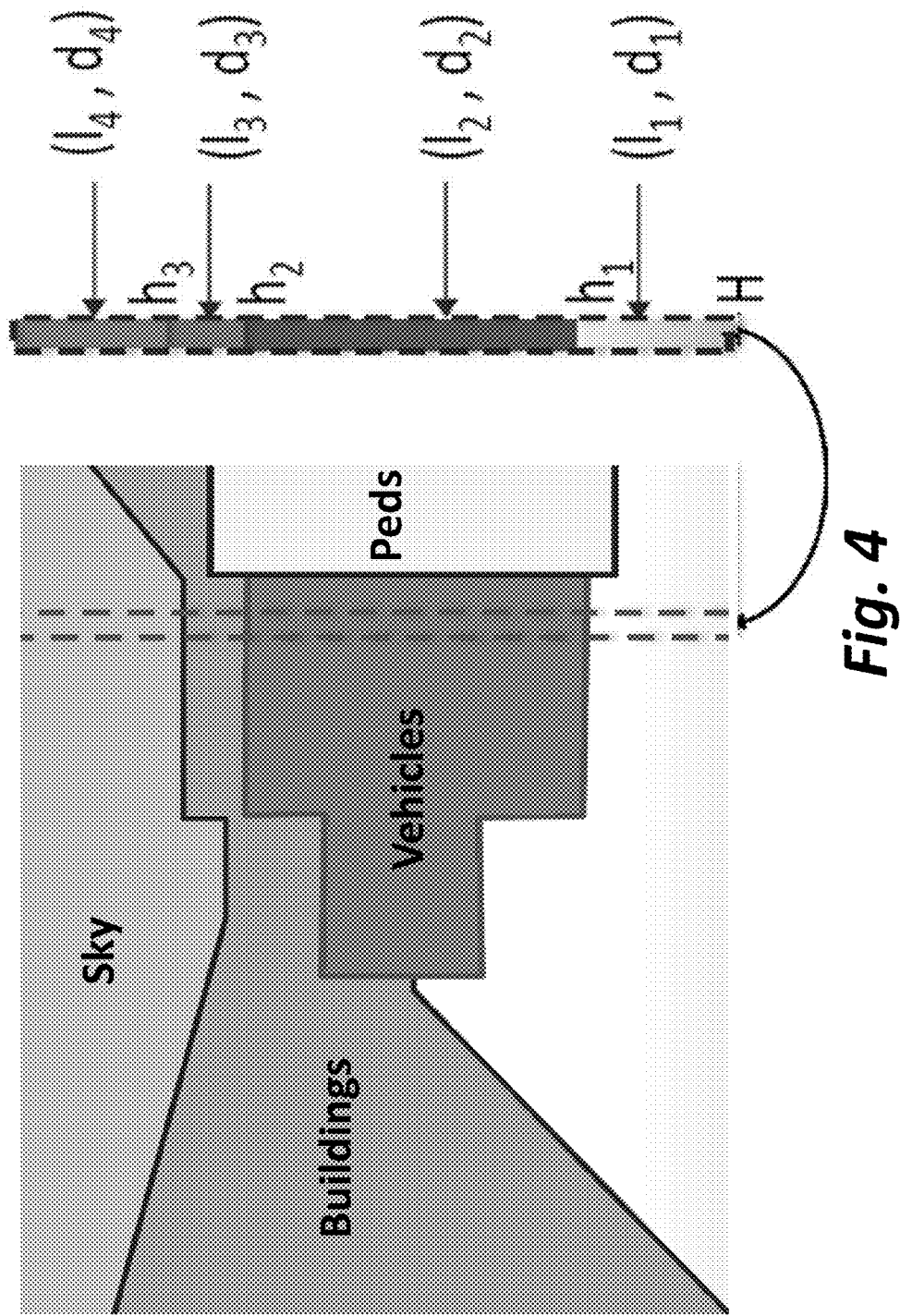

METHOD FOR LABELING IMAGES OF STREET SCENES

FIELD OF THE INVENTION

This invention relates generally to image processing, and more particularly to labeling images of street scene based on semantic and depth features in the images.

BACKGROUND OF THE INVENTION

Online street view applications are often combined with online mapping applications. For example, a user selects a specific geographical point of interest from a map or a satellite image, and then switches to a panoramic street view. The street view enables the user to navigate to the point of interest as it would be seen, for example, by a driver of a vehicle. Street view can also be used for in many other computer vision, augmented reality, smart car and safety applications.

A typical street scene includes components, such as roads in a ground plane, objects such as pedestrians, bicyclists, other vehicles, buildings and sky. Understanding and labeling images of such a scene require understanding the components and their relative spatial locations. Most conventional methods solve this as two problems: three-dimensional (3D) scene reconstruction and component segmentation.

Recently, these two problems have been merged and solved as a single optimization problem, although several challenges still exist. Prior art segmentation focuses on classifying the pixels into different classes. Such approaches generally take a long time and may not respect the layered constraint that is preserved for street scenes.

Street scene labeling is related to semantic segmentation and scene understanding. Early prior art methods were usually based on hand-designed features. Recently, it has been shown that using deep neural networks for feature learning leads to better performance. Solving both semantic segmentation and depth estimation from stereo camera can be performed using a unified energy minimization framework.

One popular model for road scene is a "stixel world" that simplifies the world using a ground plane and a set of vertical sticks on the ground representing obstacles. Stixels are compact and efficient for representing a part of an upright object, standing on the ground, by its 3D foot print, height, width and distance to the camera (depth). The stixel representation can be characterized as the computation of two curves, possibly very non-smooth, where the first curve runs on the ground plane enclosing the free space that can be immediately reached without collision, and the second curve encodes the vertical object's boundary of the free space. To determine the stixel world, either a depth map from semi-global stereo matching procedure (SGM), or stereo matching cost can be used.

A stixmantics scene representation is more flexible compared to stixels. Instead of having only one stixel for every column, stixmantics allow multiple segments along every column in the image and also combine nearby segments to form superpixel-style entities with better geometric meaning.

SUMMARY OF THE INVENTION

The embodiments of the invention provide a four-layered model for a street scene and a method for labeling semantic classes for components, such as ground, e.g., a road, moving objects such as pedestrians and vehicles, buildings, and the sky.

The input to the method is a pair of stereo images. A neural network is used to extract features for the semantic classes from the stereo images. The layered model is obtained using an inference procedure that jointly estimates the semantic classes and layered depths for each image column.

BRIEF DESCRIPTION OF THE DRAWINGS

FIG. 4 is a schematic of labeled layers according to embodiments of the invention.

DETAILED DESCRIPTION OF THE PREFERRED EMBODIMENTS

Figure 1:
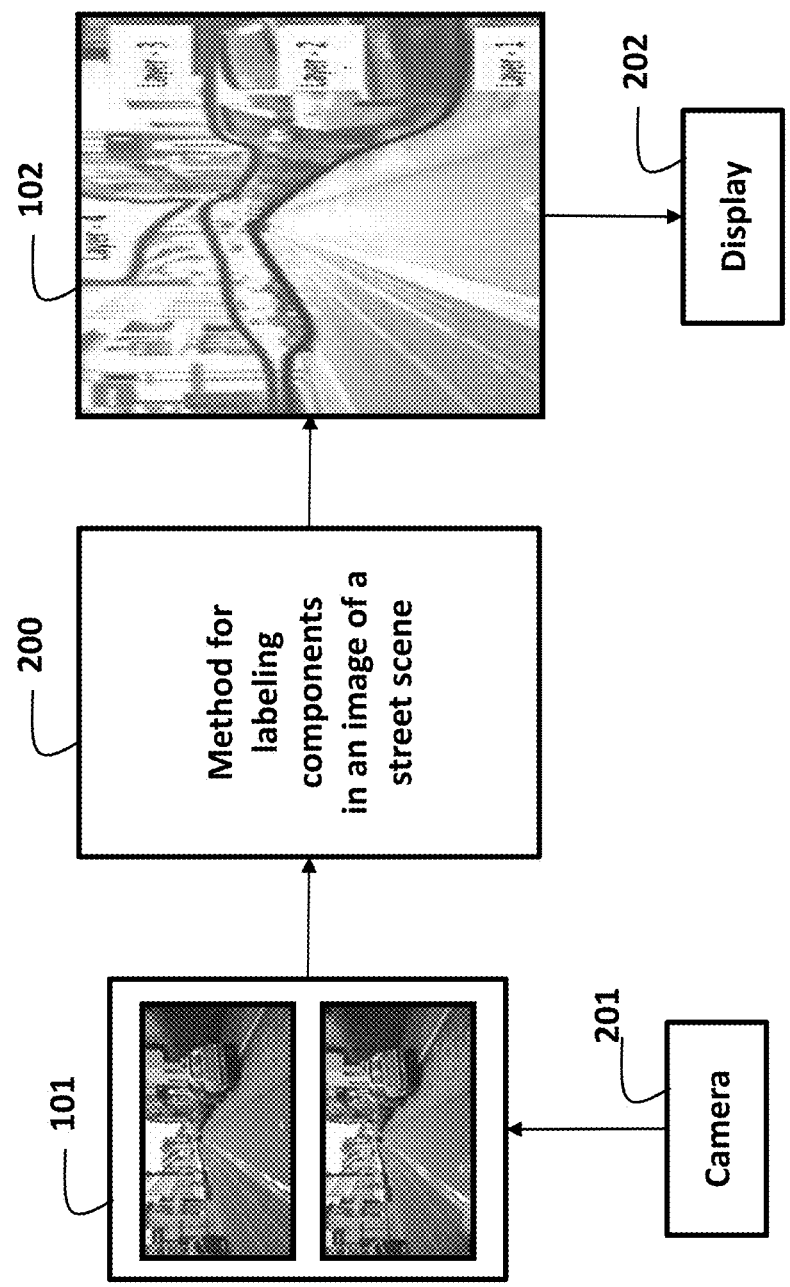
FIG. 1 is a schematic of a method for labeling components in a pair of stereo images according to embodiments of the invention.
Figure 2:
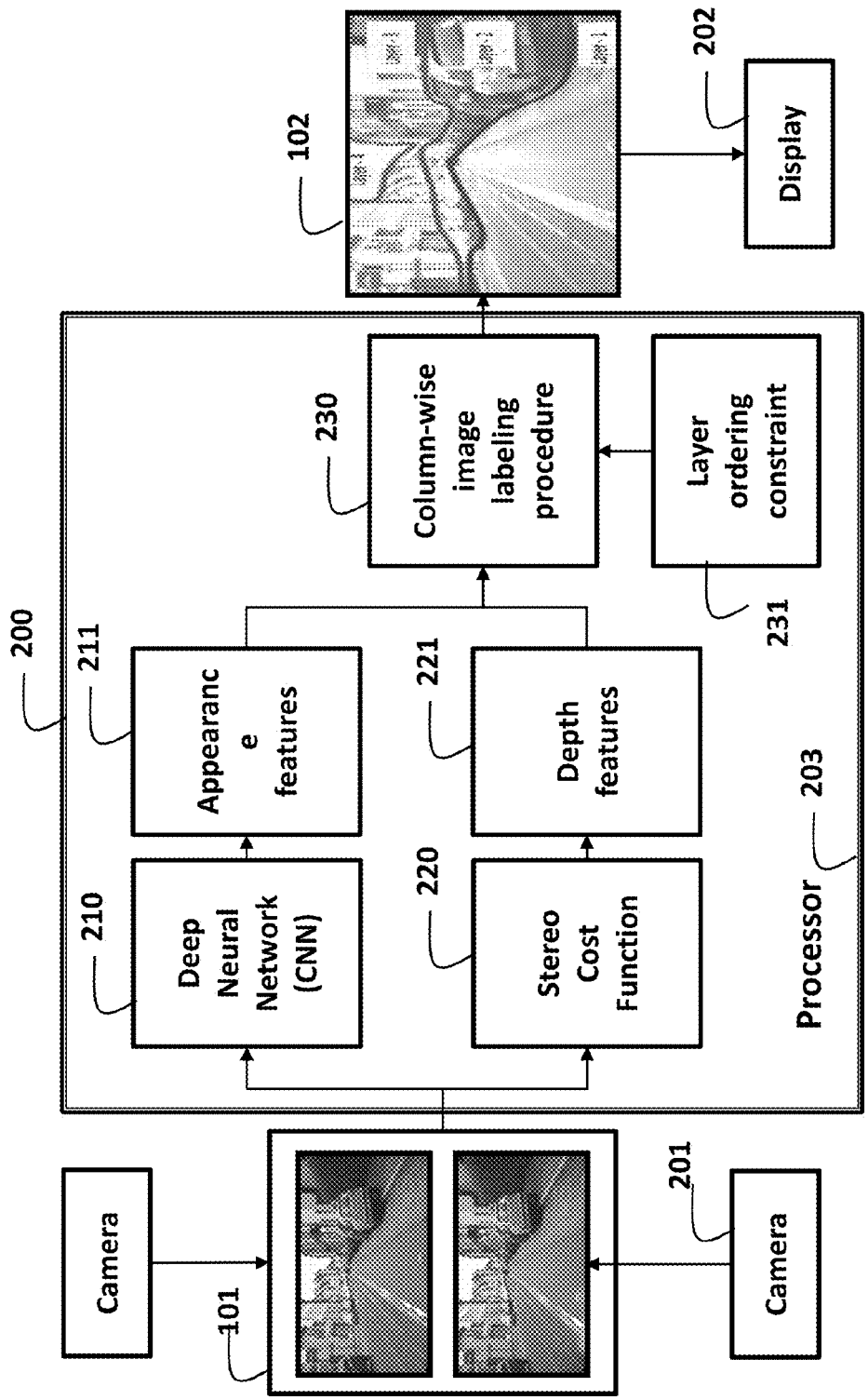
FIG. 2 is a flow diagram of the method of FIG. 1 according to embodiments of the invention.

As shown in FIGS. 1 and 2, the embodiments of our invention provide a four-layered model for a street scene and a method 200 for labeling components in a pair of stereo images 101, such as ground, e.g., a road, objects such as pedestrians and vehicles, buildings, and the sky. The images can be acquired by a camera 201. A labeled image 102 can be output on a display 202. The steps of the method can be performed in a processor 203 connected to memory, input/output interfaces by buses as known in the art. In one embodiment, the display and the processor can be arranged in a vehicle. This way, a driver of the vehicle can be apprised of an enhanced image of the scene.

A deep neural network, e.g., a convolutional neural network (CNN) 210, is used to extract image features 211 for the semantic classes from the stereo images 101. A stereo cost function 220 is used to extract depth features 221. The image and depth features are processed by a column-wise image labeling procedure 230, subject to a layer ordering constraint 231 to produce the labeled image 102.

Layered Street Scene

Figure 3:
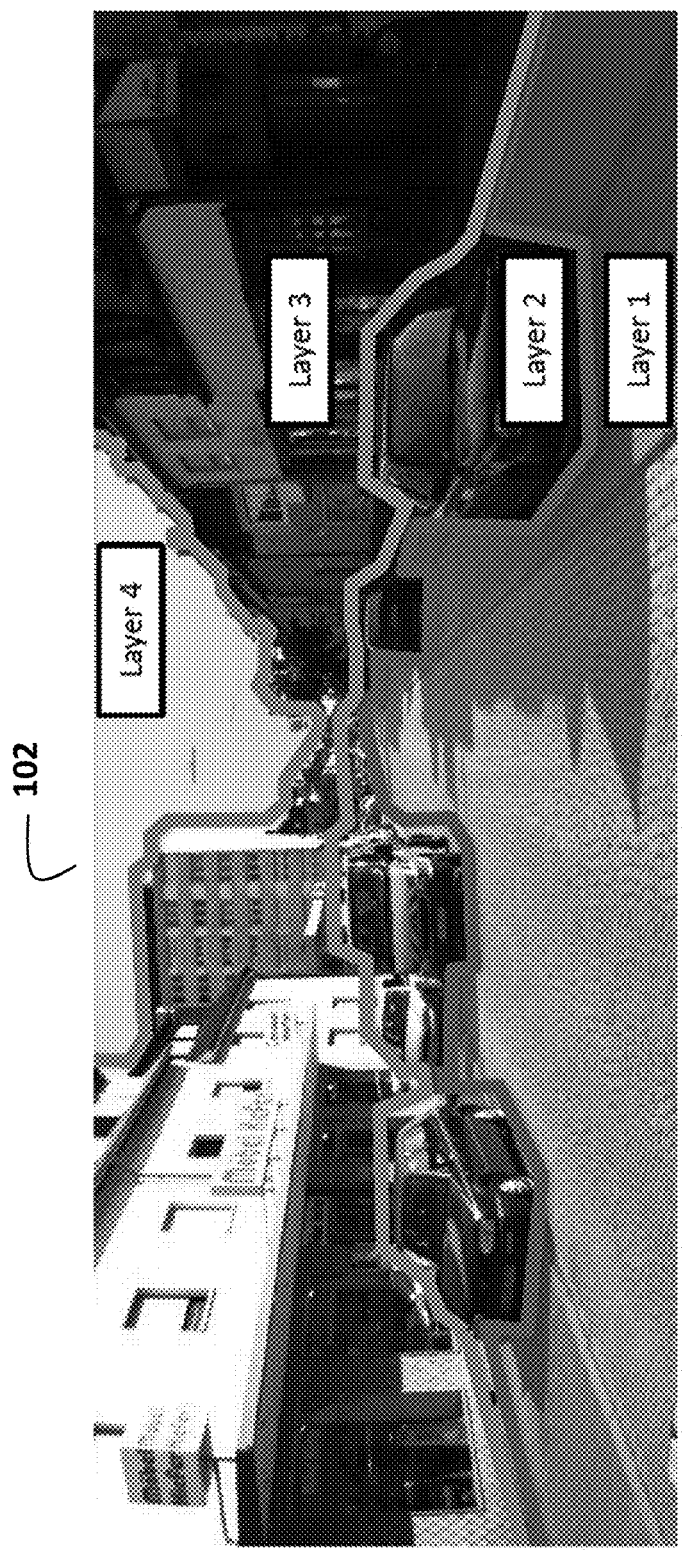
FIG. 3 is an image of a street scene with four layers according to embodiments of the invention.

As shown in FIG. 3, it is an objective of the invention to jointly estimate a semantic label and depth for each pixel in the street view image using appearance and three-dimensional information. We use a layered image interpretation. An image is horizontally partitioned into one to four layers of different semantic and depth components. Layer-1 is the ground plane, e.g., a road. Layer-2 can include pedestrians (peds) and other dynamic objects such as vehicles and motorcycles. Layer-3 contains buildings, and layer-4 is sky.

The layers are ordered from the bottom to the top. In each image column, pixels belonging to the same layer have the same semantic label and approximate depth. The only exception is that the depths of the pixels in the ground layer can vary according to their vertical image coordinates, which is determined by the ground plane. We enforce a depth-order constraint, i.e., the depth of a lower layer is always smaller than the depth of a higher layer in each image column.

For example, the first layer can only have ground, e.g., a drivable area. The second layer can include objects, e.g., pedestrians or vehicles. The third layer can have only buildings. The fourth layer can only have sky. We do not enforce that each image column has exactly four layers. A column can have one to four layers, in other words a column does not have to include all four layers. This implies that boundaries separating the layers need not be smooth and continuous. The four-layer model provides a rich and organized interpretation of street scenes. We provide a flexible method for enforcing geometry and semantics in the scene as described below.

Notations

We use $\mathcal{W}=\{1, 2, \ldots, W\}$ and $\mathcal{H}=\{1, 2, \ldots, H\}$ to refer the sets that contain horizontal x and vertical y coordinates respectively, where $W=|\mathcal{W}|$ and $H=|\mathcal{H}|$ are the image width and height. We use five different semantic classes: namely, ground, vehicle, pedestrian, building, and sky denoted by the symbols $\mathbb{G}$, $\mathbb{V}$, $\mathbb{P}$, $\mathbb{B}$ and, $\mathbb{S}$ respectively. The set of the semantic class labels is denoted by $\mathcal{L}=\{\mathbb{G}, \mathbb{V}, \mathbb{P}, \mathbb{B}, \mathbb{S}\}$. We use $\mathcal{D}$ for the set of disparities (depths). Herein, disparity and depth are used interchangeably. It is understood that a one-to-one conversion can be obtained by using camera calibration parameters. The cardinality of the semantic label space and disparity values are denoted by $L=|\mathcal{L}|$ and $|\mathcal{D}|$ respectively.

Street Scene Model

As shown in FIG. 4, we formulate the layered street view problem as a constrained energy minimization problem. The constraints encode the order of the semantic object class labels and depth values in each column. The constraints limit the solution space of the variables associated with each image column. We solve the constrained energy minimization problem efficiently using an inference algorithm based on dynamic programming.

We use the variables, $h_{i1}$, $h_{i2}$, $h_{i3}$, and $h_{i4}$, to denote the y coordinates of the top pixels of the four layers in the image column 400. Let $l_{i1}$, $l_{i2}$, $l_{i3}$, and $l_{i4}$ be the semantic object class labels for the four layers, and let $d_{i1}$, $d_{i2}$, $d_{i3}$, and $d_{i4}$ be the depths of the four layers in the image column i. The ordering constraint and the knowledge of the ground planes allow us to know some of these parameters. The actual number of unknowns is only 5 given by $x_i=[h_{i1}, h_{i2}, h_{i3}, l_{i2}, d_{i3}]$. Hence, the label assignment for the entire image is given by $x_I=[x_1, x_2, \ldots, x_W]$. The number of possible assignments for an image column is in the order $O(H^3LD)$, since $h_{i1}, h_{i2}, h_{i3} \in \mathcal{H}$, $l_{i2} \in \mathcal{L}$, and $d_{i3} \in \mathcal{D}$.

Label Likelihood Ranking

To rank the likelihood of the label assignment, we use evidence from image appearance features 211 and stereo disparity matching features 221. We aggregate evidence from all the pixels in a column to compute the evidence. Let $U_i^A(x_i)$ and $U_i^D(x_i)$ be the data terms representing the semantic and depth label cost, respectively, incurred as assigning $x_i$ to the image column i. The two terms are summed to yield the data term $U_i(x_i)=U_i^A(x_i)+U_i^D(x_i)$ denoting the cost for assigning $x_i$ to the image column i. Instead of working on the standard 2D Markov Random Field (MRF) space where each pixel can have a depth value and a semantic label as independent variables, we reduce the problem to a constrained energy minimization problem given by $$\min_{x_i} \sum_{i=1}^{W} U_i(x_i)$$

s.t. $h_{i1} > h_{i2} > h_{i3} > h_{i4} = 1$,

-continued $d_{i1} < d_{i2} < d_{i3} < d_{i4}$, $l_{i1} = \mathbb{G}, l_{i2} \in \{\mathbb{V}, \mathbb{P}\}, l_{i3} = \mathbb{B}, l_{i4} = \mathbb{S}, \forall i$ where the first constraint gives the layer structure, the second constraint enforces the depth order, and the third constraint limits the semantic variation. The variable $d_{i2}$ is a function of $h_{i1}$, i.e., the top pixel location of the ground layer, because we assume the dynamic object is vertical with respect to the horizontal ground surface at the $h_{i1}$th row of the image. The energy function $\Sigma_{i=1}^{W} U_i(x_i)$ models the relation of pixels in the same column, but not pixels in the same row. The relation of pixels in the same row are implicitly encoded in the feature functions. We use image patches centering around a pixel as reception fields for the feature computation at the pixel location. Neighboring pixels have similar reception fields, and hence, have similar feature representation and class label assignments.

The data term $U_i(x_i)$ is the cost of assigning label $x_i$ to the column i. The data term is the sum of the pixel-wise data terms given by $$U_i(x_i) = \sum_{y=h_{i4}}^{h_{i3}-1} E^A(i, y, \mathbb{S}) + E^D(i, y, \infty)$$

$$\sum_{y=h_{i3}}^{h_{i2}-1} E^A(i, y, \mathbb{B}) + E^D(i, y, d_{i3})$$

$$\sum_{y=h_{i2}}^{h_{i1}-1} E^A(i, y, l_{i2}) + E^D(i, y, d_{i2}(h_{i1}))$$

$$\sum_{y=h_{i1}}^{H} E^A(i, y, \mathbb{G}) + E^D(i, y, d_{i1}),$$

where the per pixel appearance data term $E^A(x, y, l)$ is the cost of assigning label l to the pixel (x, y) and the per pixel depth data term $E^D(x, y, d)$ is the cost of assigning depth d to the pixel (x, y). We use a deep convolutional neural network for obtaining the per pixel appearance data term $E^A(x, y, l)$, and use a conventional disparity cost for obtaining the per pixel depth data term $E^D(x, y, d)$.

Depth Features

We use the smoothed absolute intensity difference for the per pixel depth data term, which is commonly used in the stereo reconstruction algorithms. We first compute the pixel wise absolute intensity difference for each disparity value in D, which renders a cost volume representation. A box filter is then applied to smooth the cost volume. The per pixel depth data term is given by $$E^D(x, y, d) = \frac{1}{N} \sum_{(\tilde{x}, \tilde{y}) \in P_{(x,y)}} |I_L(\tilde{x}, \tilde{y}-d) - I_R(\tilde{x}, \tilde{y})|,$$

where $I_L$ and $I_R$ refer to the intensity values of the left and right images, $P_{(x,y)}$ is an image patch centered at (x, y), and $N=|P_{(x,y)}|$ denotes the cardinality of the patch, serving as a normalization constant. The patch size is fixed to, e.g., 11-by-11 pixels.

Appearance Features

We determine the per pixel appearance data term using a deep multi-scale convolutional network (CNN). For example, the network has three convolutional layers:

(1) 16 filters of size 8×8 followed by rectified linear (ReLU) non-linearity and 2×2 max-pooling; and
(2) 64 filters of size 7×7×16 followed by ReLU and 2×2 non-overlapping max-pooling;
(3) 256 filters of size 7×7×64 followed by ReLU.

In one embodiment, we use grayscale images, scaled between 0 to 1 and centered by subtracting 0.5 as input for the CNN. Filters, shared across the scales, are applied separately to the three scales of a Gaussian pyramid of the input images.

Note that the feature from lower scales are upsampled to the original image size. The feature from the three scales are concatenated to obtain 3×256=768 features per pixel. To train the network, we connect the feature layer to a fully connected layer having five neurons (classes) followed by a softmax or normalized exponential layer. We can also use dropout in a fully connected layer. The network is trained by minimizing the cross-entropy error via stochastic gradient descent with momentum. We use a negative logarithm of the softmax scores of the classes as the per-pixel appearance data terms.

Inference Procedure

We decompose the energy minimization problem in Equation (2) into W sub-problems where the ith sub-problem is given by $$\min_{x_i} U_i(x_i)$$
$$\text{s.t. } h_{i1} > h_{i2} > h_{i3} > h_{i4} = 1,$$
$$d_{i1} < d_{i2} < d_{i3} < d_{i4},$$
$$l_{i1} = \mathbb{G}, l_{i2} \in \{\mathbb{V}, \mathbb{P}\}, l_{i3} = \mathbb{B}, l_{i4} = \mathbb{S}.$$

We solve each of the sub-problems optimally and combine their solutions to construct the full semantic and depth labeling of the image. For simplicity in the notations, we will drop the subscript i in the description below.

Each of the sub-problems can be mapped to a 1D chain labeling problem. The chain has 4 nodes where the first node contains the variables of $(h_1, d_1, l_1)$, the second node contains the variables of $(h_2, d_2, l_2)$, the third node contain the variables of $(h_3, d_3, l_3)$, and the fourth node contain the variables of $(h_4, d_4, l_4)$. Utilizing the recursion in the label cost evaluation, conventional dynamic programming algorithm can solve the 1D chain labeling problem with a complexity of $O((HDL \cdot H)^2)$, where the product HDL represents the size of label space at each node and the second H is the complexity required for the label cost evaluation at each node. Unfortunately, the complexity is too high for real-time applications.

We describe a variant of the dynamic programming algorithm to reduce the complexity of solving the sub-problem in (9) to $O(H^2D)$ and achieve real-time performance. We first note that some of the variables are known from our street view setup as described in the problem formulation section. We only need to search the values for $h_1, h_2, h_3, l_2, d_3$. For any combination of $h_1$ $h_2$ and $l_2$, we determine the best combination of $d_3$ and $h_3$. In the following, we show that pre-computing the best combination of $d_3$ and $h_3$ for any $h_1$ $h_2$ and $l_2$ can be achieved in $O(H^2D)$ time using recursion.

We first observe that the problem in (9) can then be written as $$\min_{h_1,h_2,l_2} \sum_{y=h_2}^{h_1-1} E^A(i, y, l_2) + E^D(i, y, d_2(h_1)) +$$

-continued $$\sum_{y=h_1}^{H} E^A(i, y, \mathbb{G}) + E^D(i, y, d_1) + Q_i(h_2)$$

where $Q_i$ is an intermediate cost table given by $$Q_i(h_1, h_2) \equiv \min_{\substack{h_3, d_3 \\ d_3 > d_2(h_1)}} \sum_{y=h_4}^{h_3-1} E^A(i, y, \mathbb{S}) +$$
$$E^D(i, y, \infty) + \sum_{y=h_3}^{h_2-1} E^A(i, y, \mathbb{B}) + E^D(i, y, d_3).$$

Note that depth of the second layer object $d_2$ is a function of $h_1$ because $d_2$ can be uniquely determined from $h_1$ and the ground plane equation. As a result, $Q_i$ depends on both $h_1$ and $h_2$.

By integrating $E^A(i, y, \mathbb{B}) + E^D(i, y, d_3)$ and $E^A(i, y, \mathbb{S}) + E^D(i, y, \infty)$ along the y direction, the sum given by $$R_i(h_2, h_3, d_3) \equiv$$
$$\sum_{y=h_4}^{h_3-1} E^A(i, y, \mathbb{S}) + E^D(i, y, \infty) + \sum_{y=h_3}^{h_2-1} E^A(i, y, \mathbb{B}) + E^D(i, y, d_3)$$

for all combination of $h_2$ and $h_3$ can be computed in $O(H^2)$ time for fixed $d_3$. We further note that $Q_i$ can be computed via a recursive update rule given by $$Q_i(h_1 + 1, h_2) = \min\left(Q_i(h_1, h_2), \min_{h_3} R_i(h_2, h_3, \tilde{d})\right),$$

where $\tilde{d}$ is an integer satisfying $d_2(h_1) \leq \tilde{d} < d_2(h_1+1)$ and is used to ensure that the depth ordering constraint between the second and third layers is met.

Intuitively, we are computing a running min structure along the decreasing depth of the building layer. The recursive update rule allows us to compute $Q_i$ for any $h_1$ and $h_2$ in $O(H^2D)$ time. As a result, the complexity of finding the best configuration for a partition can be reduced to $O(H^2L + H^2D) = O(H^2D)$ where $H^2L$ is the time required for searching combinations of $h_1$ $h_2$ and $l_2$. We perform the 1D labeling algorithm to each image column. The overall complexity of the labeling algorithm is $O(W H^2 D)$.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for labeling an image of a street view, wherein the image includes a set of columns of pixels, comprising the steps of:
    employing at least one processor executing computer executable instructions stored on at least one computer readable memory to facilitate performing the steps of:
    receiving the image having image pixels including respective two-dimensional features;

receiving image data points corresponding to the image, the image data points including respective three-dimensional image features;

extracting, for each pixel, an appearance feature from the image pixels, wherein the appearance features are determined using a deep neural network learned from a labeled dataset;

extracting, for each pixel, a depth feature from the image data points; and applying a column-wise labeling procedure to jointly determine a semantic label and a depth label for each pixel for each column of pixels from the set of columns of pixels of the image using both the appearance features and the depth features from their respective column of pixels, and wherein the column-wise labeling procedure is according to a model of the street view, wherein each column of pixels of the set of columns of pixels includes at most four ordered layers from a top layer or a fourth layer to a first layer or a bottom layer, such that the at most four ordered layers are obtained using an inference procedure that jointly estimates the sematic labels and the depth labels for each image column;

processing, the column-wise labeling procedure subject to the at most four ordered layers to produce the labeled image, and the steps are performed in the processor.

2. The method of claim 1, wherein the first layer of the street view model represents drivable areas, a second layer represents dynamic objects common in the street, a third layer represents static objects, and the fourth layer represents sky, and wherein the depths in the layers are ordering from top to bottom.

3. The method of claim 2, wherein the drivable areas in the first layer include ground, grass, sidewalk.

4. The method of claim 2, wherein the dynamic objects in the second layer include vehicles, pedestrians, bicyclists, motorcyclists, and animals.

5. The method of claim 2, wherein the static objects in the third layer include buildings, bridges, and trees.

6. The method of claim 1, wherein the appearance features are determined using the deep neural network learned from the labeled dataset, such that the deep neural network is used to extract image features for sematic classes from the images.

7. The method of claim 1, wherein the depth feature is determined from disparity matching cost obtained from a stereo image.

8. The method of claim 1, wherein the depth label for a pixel in the top layer of a column of pixels is greater than the depth label of a pixel in the remaining lower layers of the column of pixels.

9. The method of claim 1, wherein the depth label for a pixel in the bottom layer of a column of pixels is determined by a ground plane constraint.

10. The method of claim 1, wherein the image is acquired by a camera device or an image acquiring device, and the labeled image is an output on a display, such that the display and the processor are arranged in a vehicle.

11. A method for labeling an image of a street view, wherein the image includes a set of columns of pixels, comprising the steps of:

employing at least one processor executing computer executable instructions stored on at least one computer readable memory to facilitate performing the steps of:

receiving the image having image pixels including respective two-dimensional features;

receiving image data points corresponding to the image, the image data points including respective three-dimensional image features;

extracting, for each pixel, an appearance feature from the image pixels, wherein the appearance features are determined using a deep multi-scale convolutional network from a labeled dataset used to extract image features for sematic classes from the images;

extracting, for each pixel, a depth feature from the image data points; and applying a column-wise labeling procedure to jointly determine a semantic label and a depth label for each pixel for each column of pixels from the set of columns of pixels of the image using both the appearance features and the depth features from their respective column of pixels, and wherein the column-wise labeling procedure is according to a model of the street view, wherein each column of pixels of the set of columns of pixels includes at most four ordered layers from a top layer or a fourth layer to a first layer or a bottom layer, such that the at most four ordered layers are obtained using an inference procedure that jointly estimates the sematic labels and depth labels for each image column;

processing, the column-wise labeling procedure subject to the at most four ordered layers to produce the labeled image, and the steps are performed in the processor.

12. The method of claim 1, wherein the inference procedure is based on a dynamic algorithm, that includes variables, $h_{i1}$, $h_{i2}$, $h_{i3}$, and $h_{i4}$, to denote y coordinates of top pixels of the at most four ordered layers, such that $l_{i1}$, $l_{i2}$, $l_{i3}$, and $l_{i4}$ are semantic labels for the at most four ordered layers, and $d_{i1}$, $d_{i2}$, $d_{i3}$, and $d_{i4}$ are depths of the at most four ordered layers, wherein only unknown variables are determined, for example, if the unknown variables included $h_1$, $h_2$, $h_3$, $l_2$, $d_3$, then the unknown variables are determined by $$R_i(h_2, h_3, d_3) \equiv \sum_{y=h_4}^{h_3-1} E^A(i, y, \mathbb{S}) + E^D(i, y, \infty) + \sum_{y=h_3}^{h_2-1} E^A(i, y, \mathbb{B}) + E^D(i, y, d_3).$$

13. The method of claim 11, wherein the inference procedure is based on a dynamic algorithm, that includes variables, $h_{i1}$, $h_{i2}$, $h_{i3}$, and $h_{i4}$, to denote y coordinates of top pixels of the at most four ordered layers, such that $l_{i1}$, $l_{i2}$, $l_{i3}$, and $l_{i4}$ are semantic labels for the at most four ordered layers, and $d_{i1}$, $d_{i2}$, $d_{i3}$, and $d_{i4}$ are depths of the at most four ordered layers, wherein only unknown variables are determined, for example, if the unknown variables included $h_1$, $h_2$, $h_3$, $l_2$, $d_3$, then the unknown variables are determined by $$R_i(h_2, h_3, d_3) \equiv \sum_{y=h_4}^{h_3-1} E^A(i, y, \mathbb{S}) + E^D(i, y, \infty) + \sum_{y=h_3}^{h_2-1} E^A(i, y, \mathbb{B}) + E^D(i, y, d_3).$$

* * * * *